March 20, 1962 H. P. ANDERSON 3,026,425

BISTABLE CIRCUIT USING AVALANCHE EFFECT IN A DOUBLE BASE DIODE

Filed Jan. 29, 1959 2 Sheets-Sheet 1

INVENTOR
H. P. ANDERSON
BY Lucian C. Canepa
ATTORNEY

March 20, 1962 H. P. ANDERSON 3,026,425
BISTABLE CIRCUIT USING AVALANCHE
EFFECT IN A DOUBLE BASE DIODE
Filed Jan. 29, 1959 2 Sheets-Sheet 2

INVENTOR
H. P. ANDERSON
BY Lucian C. Canepa
ATTORNEY

United States Patent Office 3,026,425
Patented Mar. 20, 1962

3,026,425
BISTABLE CIRCUIT USING AVALANCHE EFFECT IN A DOUBLE BASE DIODE

Harold P. Anderson, Morris Plains, N.J., assignor to Bell Telephone Laboratories, Incorporated, New York, N.Y., a corporation of New York Filed Jan. 29, 1959, Ser. No. 789,812
13 Claims. (Cl. 307—88.5)

This invention relates to bistable circuits, and more particularly to bistable circuits for counting pulses of the same polarity.

Many useful applications, for example, counting or switching systems, require bistable circuits in which an element is triggered "on" by a pulse, thereby to remain "on" for an arbitrarily long time even after the pulse has terminated, only returning to its "off" condition when a second trigger pulse is applied thereto. An example of such a circuit is the well-known Eccles-Jordan bistable flip-flop.

In various such prior art circuits a bistable element is triggered by pulses of alternately opposite polarity applied to the same input terminal or by pulses of the same polarity alternately applied to two different input terminals. Thus, for example, a transistor may be triggered by applying pulses of alternately opposite polarity to the emitter or base thereof, or by applying pulses of the same polarity alternately to the emitter and base. B. Ostendorf, Jr., Patent 2,831,983, April 22, 1958, discloses one example of such a circuit.

However, it may be essential in a given application requiring a counter circuit that the circuit be responsive to, or capable of counting, pulses of the same polarity that are applied to a single point or input terminal of the circuit. Also, it is, of course, desirable that such circuits be characterized by excellent reliability of response to triggering pulses and by simplicity, compactness and economy of construction.

Another type of known counting configuration comprises one or more transistors and a plurality of routing or steering diodes. Such configurations may be triggered by applying either positive or negative pulses to a single transistor electrode thereof. Reference may be made to A. E. Anderson and R. L. Trent Patent 2,622,212, December 16, 1952, for an example of this type of counter.

An object of the present invention is an improved counter.

More specifically, an object of this invention is a simple reliable circuit, not including steering diodes, which is capable of counting pulses of the same polarity.

A further object of the present invention is a compact economical counting configuration including a semiconductor device, to a single input terminal of which pulses of one polarity may be applied, thereby to provide a single output pulse of the other polarity in response to each two successive input pulses. Alternatively, the points between which the output is developed may be chosen such that the output is a single pulse of one polarity.

These and other objects of the present invention are realized in a specific illustrative embodiment thereof which includes a double-base diode. A double-base diode is a semiconductor device having one p-n junction contact and two ohmic or base contacts. Such devices are described in an article by I. A. Lesk and V. P. Mathis, entitled "The Double-Base Diode: A New Semiconducting Device," which appears in part 6 of the 1953 Convention Record of the Institute of Radio Engineers.

A counter made in accordance with the principles of this invention includes a source of direct current power and a resistor connected to each terminal of this source. The free ends of these two resistors are respectively connected to the ohmic or base contacts of the double-base diode. Two other resistors are serially connected between the terminals of the power source, and the p-n junction or emitter contact of the diode is connected to a point between these two other resistors. Trigger or input pulses are applied between the junction contact and one of the source terminals, and an output may be derived from one of the base-connected resistors.

The power source and the resistors of an illustrative embodiment of the present invention are arranged such that the p-n junction of the double-base diode is normally biased in the reverse direction. Then, the application of a first trigger pulse to such an embodiment causes the junction to breakdown, thereby charging the potential distribution between the base contacts of the diode in such a manner that the junction becomes forward-biased and, as a result, an output appears across one of the base-connected resistors. The output is maintained across this resistor until a second trigger pulse is applied to the configuration, at which time the junction returns to its normal or quiescent condition wherein it is reverse-biased short or breakdown, and the voltage across the output resistor then falls to a "no-output" level.

Thus, each two successive input pulses causes the output level of the counter to change from "no-output" to "output" and back to "no-output." In other words, the configuration is capable of providing a single output pulse in response to each two successive input pulses.

One feature of this invention is a counter configuration including a body or member of semiconductive material having formed therein a p-n junction, which junction is driven in a negative direction by each input trigger pulse applied thereto, thereby selectively changing the potential distribution in the material and, in that way, the current level in an output detector connected to the semiconductive body.

It is another feature of this invention that the body of semiconductive material include a pair of ohmic connections and a rectifying junction, the junction being normally reverse-biased in a low current state but being reverse-biased to avalanche breakdown by a first input pulse, the junction becoming forward-biased on cessation of this pulse and returning to its normal low current reverse-bias state upon the occurrence of a next successive input pulse.

It is a further feature of one specific illustrative embodiment of this invention that current detecting means be connected between the junction and the circuitry applying the normal bias thereto, to provide an output indication due to the flow of current when the junction is forward-biased.

It is a further feature of another specific illustrative embodiment of the present invention that a counter comprise a source of direct current power having two terminals, a semiconductor device having a first base contact, a second base contact and an emitter contact, a first resistor connected between the first base contact and the more positive of the source terminals, a second resistor connected between the second base contact and the more negative of the source terminals, third and fourth resistors serially connected between the two terminals, the emitter contact being connected to a point between the third and fourth resistors, and an input circuit connected between the emitter contact and one of the source terminals, whereby the application of each two successive pulses to the input circuit produces across one of the base-connected resistors a single output pulse.

Thus, in accordance with the principles of this invention there is provided a simple reliable counter circuit which responds to successive pulses of the same polarity applied to a single input terminal, which counter does not require steering diodes or other cumbersome circuit techniques.

A complete understanding of the present invention and of the above and other features thereof may be gained from a consideration of the following detailed description and the accompanying drawing, in which.

Figure 1A:
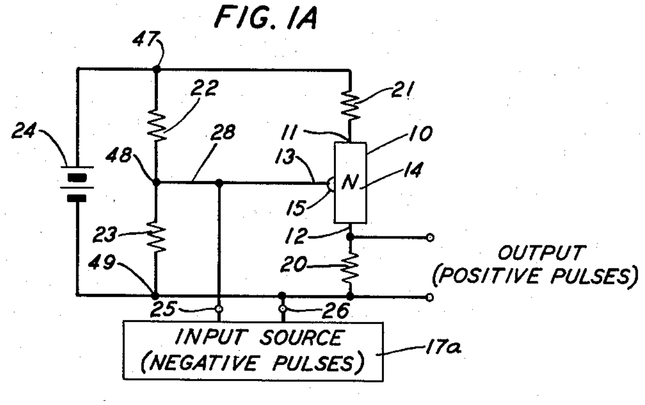
FIGS. 1A and 1B are circuit diagrams of counters illustratively embodying the principles of the present invention.

In FIG. 1A there is shown a double-base diode 10 having a first ohmic or nonrectifying base contact 11, a second ohmic or nonrectifying base contact 12, and an emitter contact 13.

The diode 10 comprises a body 14 of semiconductive material of, for example, n-type conductivity. Formed on a localized portion of the body 14 is a p-n junction 15 to the p-side of which the emitter contact 13 is secured.

Resistors 20, 21, 22 and 23 and a source of direct current power 24 are interconnected with the emitter and base contacts of the diode 10, as shown in FIG. 1A, and are so proportioned in value that the potential of a point 48 between the resistors 22 and 23 is negative with respect to a point in the body 14 immediately adjacent to the n-side of the p-n junction 15. The junction 15 is, therefore, reverse-biased to, for example, point 30 on the curve of FIG. 3, at which point a relatively small reverse current flows thereacross.

Figure 1B:
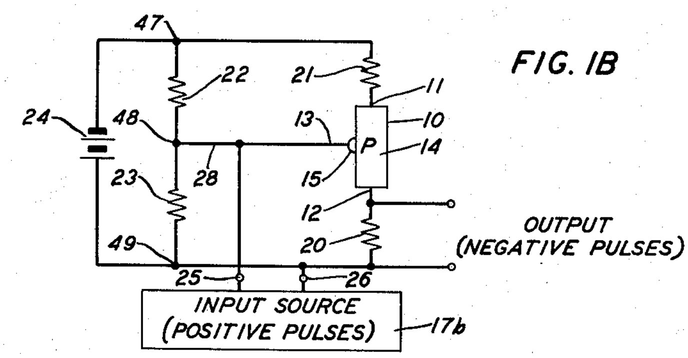

It is to be noted that a double-base diode device 10 having a body 14 of p-type conductivity may be included in a circuit illustratively embodying the principles of the present invention, provided that the polarities of the voltages supplied by the direct current source 24 and the input source are respectively reversed; such a circuit is shown in FIG. 1B. In the interest of clarity of presentation, emphasis herein will be mainly directed to a counter circuit having a semiconductor device whose body is of n-type conductivity.

Figure 3:
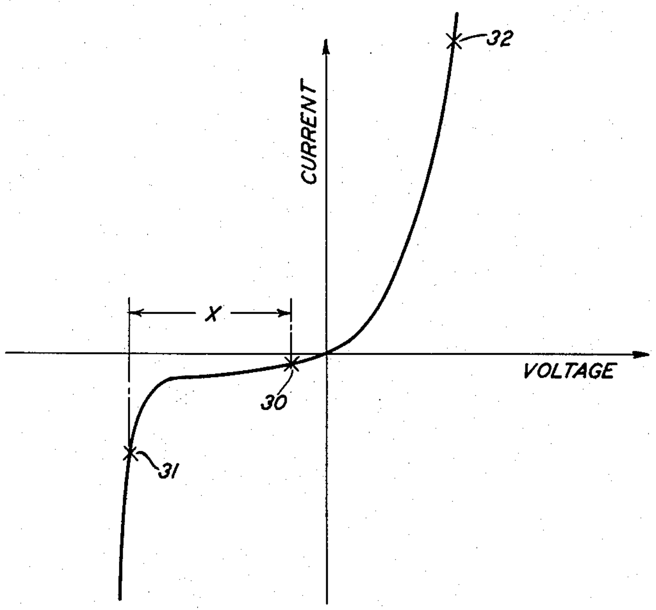
FIG. 3 is a plot of current versus voltage for a typical p-n junction.

Point 30 of FIG. 3 indicates the normal or quiescent condition of the p-n junction 15 in the absence of any pulses applied to the input terminals 25 and 26 by the input source 17_a_. Under this condition, there are in the circuit of FIG. 1A two main current paths: one through the serially-connected resistors 22 and 23, and the other through a series path including the resistor 21, the body 14 of the diode 10 and the output or load resistor 20.

The resistor 20 is small in value compared to the combination of the body resistance of the diode 10 and that of the element 21. Accordingly, only a small part of the supply or source voltage 24 appears across the resistor 20, and it is this small voltage which is referred to herein as the "no-output" voltage level of the counter. This normal or "no-output" voltage level is indicated in FIG. 2 by reference numeral 27 on the Output waveform.

Figure 2:
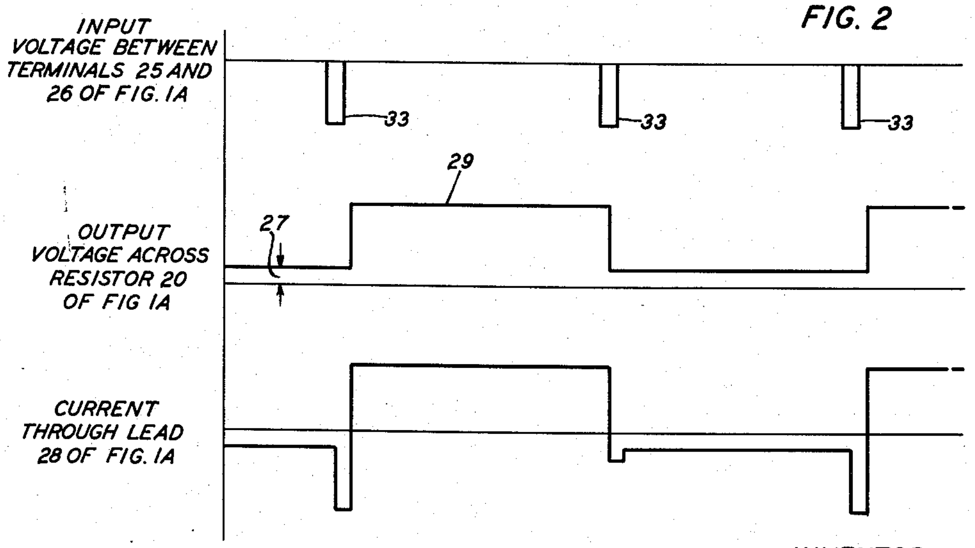
FIG. 2 is a timing diagram showing voltage and current waveforms at various specified points of the circuit of FIG. 1A.

Now, remembering that the p-n junction of the double-base diode 10 is normally biased at point 30 of the curve of FIG. 3, assume that a negative pulse 33, shown in FIG. 2, is applied to the input of the counter, thereby causing terminal 25 to be negative with respect to terminal 26. Such an input pulse will bias the junction 15 to a point such as 31 on the curve of FIG. 3 where a relatively large reverse current flows therethrough.

This current, which is commonly called the "avalanche breakdown" current, is caused by the generation in the junction region of hole-electron pairs by fast-moving current carriers, and is quite similar to the "Townsend avalanche" breakdown familiar in gas discharges. The mechanism of the phenomenon of p-n junction breakdown is described on pages 47–51 of the February 1958 Bell Laboratories Record, in an article by A. G. Chynoweth entitled "Electrical Breakdown in P–N Junctions."

The avalanche current flows into the body 14 of the diode 10 and is caused to drift toward the upper base contact 11 by the potential gradient established in the body 14 by the source 24. This current flow through the upper part of the body 14 reduces in effect the resistance of that part of the body. This reduction causes an increase in the main circuit current flow through the body 14 and the resistors 20 and 21, which in turn reduces the resistance of the entire length of the body 14.

These resistance changes, with the accompanying voltage changes which occur across the resistors 20 and 21, cause the voltage of a point immediately adjacent to the n-side of the p-n junction 15 to decrease sufficiently from its normal value so that soon after the removal of the negative input pulse the junction 15 becomes forward-biased, to a point such as 32 on the curve of FIG. 3.

It is noteworthy that once the breakdown mechanism in the p-n junction 15 has resulted in the flow of carriers into the body 14 of the double-base diode 10, the negative input pulse may be removed. Or, in other words, negative input trigger pulses need be maintained only long enough to promote the flow of carriers into the body 14.

With the p-n junction 15 in a forward-bias condition, a relative large number of holes flow into the body 14. These holes are swept by the potential gradient established by the source 24 toward the lower base contact 12 and reduce in effect the resistance of the lower part of the body 14, thereby causing the current through the path including the source 24, the resistors 20 and 21 and the device 10 to increase substantially. This current flows through the load resistor 20 and causes a relatively large voltage level to appear at the output of the counter. Reference may be made to portion 29 of the Output waveform of FIG. 2 for a showing of this output level, which level is maintained until the occurrence of a next input pulse.

The application to the counter of a second negative input pulse reverse-biases the junction 15 short of avalanche breakdown, causing a shift on the curve of FIG. 3 from operating point 32 back to point 30, which latter point was, as noted above, the point of operation of the junction 15 in its normal or quiescent state prior to the application of any input pulses to the counter circuit.

Thus, one complete cycle of operation of the configuration of FIG. 1A involves the application of two negative pulses to the input terminals 25 and 26, and the appearance of a single positive pulse across the output resistor 20, the beginning and termination of the positive pulse being defined respectively by the first and second input pulses.

Alternatively, an output consisting of a negative pulse in response to each two successive negative input pulses may be derived from between the upper base contact 11 of the device 10 and the more negative terminal of the source 24 of the circuit of FIG. 1A. Or, a single positive pulse in response to each two successive input pulses may be derived from between the upper base contact 11 and the more positive terminal of the source 24 of the circuit of FIG. 1B.

One typical set of parameters for a counter circuit of the type shown in FIG. 1A includes the following values: resistor 20—100 ohms; resistor 21—1000 ohms; resistor 22—620 ohms; resistor 23—820 ohms; direct current source 24—22.5 volts; the voltage of the emitter contact with respect to the more negative side of the source 24, in the absence of an applied pulse—12 volts; the voltage corresponding to a point immediately adjacent to the n-side of the p-n junction 15, with respect to the more negative terminal of the source 24, for (_a_) point 30 of FIG. 3 and (_b_) point 31 of FIG. 3—(_a_) 15.4 volts, (_b_) 17.6 volts; the peak amplitude of an input pulse—15 volts; and the output level corresponding to 29 of FIG. 2—10 volts. This set of parameters is for a circuit having as the semiconductor device thereof a General Electric 2N491 double-base diode.

FIG. 2 shows the waveform of the current that flows through the lead 28 of the circuit of FIG. 1A. That waveform is somewhat similar to the output waveform discussed above and suggests a modification of the circuit of FIG. 1A wherein a device which is only responsive to the positive levels of the Current waveform of FIG. 2 is included; such a modified circuit is shown in FIG. 4.

Figure 4:
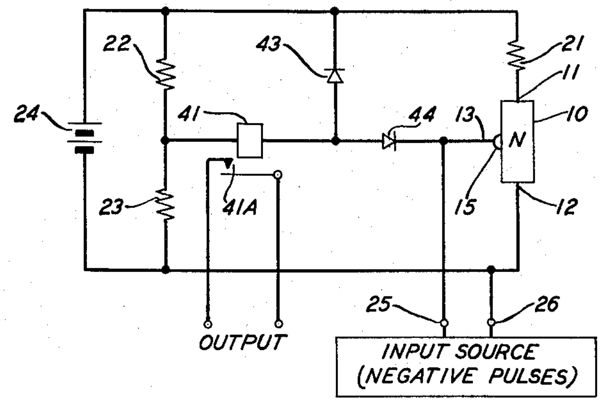
FIG. 4 is a depiction of one specific modification of the arrangement shown in FIGS. 1A and 1B.

The modified circuit of FIG. 4 is essentially the same as that of FIG. 1 and operates in exactly the same manner. The modified circuit includes a relay 41, which operates in response to the positive levels of the Current waveform of FIG. 2. The circuit of FIG. 4 includes a number of elements that may be identical in value with those of FIG. 1, and which are, therefore, identified by the same reference numerals. These elements are the resistors 21, 22 and 23, the double-base diode device 10, and the direct current power source 24. Note that no output resistor is shown connected to the base contact 12 of the device 10. Such a resistor is not necessary in the circuit of FIG. 4 in view of the fact that the relay 41 and its associated contacts 41*a* function in the modified circuit as the output element. Other output elements might equally well be included in the arrangement of FIG. 4 in place of the relay 41. For example, a suitable power transistor could be interchanged with the relay 41.

The counter circuit of FIG. 4 also includes elements 43 and 44, which advantageously may be diodes of the well-known p-n junction form. The element 43 functions to protect the device 10 from current surges caused by the relay 41, and the element 44 is included in the configuration of FIG. 4 in order to present a relatively high impedance to the driving or input pulse-supplying source connected to the terminals 25 and 26.

It is to be understood that the double-base diode device 10 of the counter circuits described herein may be replaced by any device including a member of semiconductive material to which two ohmic or nonrectifying contacts are made to portions thereof of the same conductivity type, and to which a rectifying or p-n junction contact is also made.

Further, it is noted that the resistors 22 and 23 of the circuits described above function only as voltage-dividing networks and might therefore, for example, be replaced by another direct current power source (not shown), which other source would have its positive terminal connected to the lead 28 of FIG. 1A and its negative terminal connected to the more negative terminal of the source 24. Or, alternatively, the combination of the elements 22, 23 and 24 might simply be replaced by a direct current power source having three terminals corresponding to the points 47, 48 and 49 of FIGS. 1A and 1B.

Accordingly, it is to be understood that the above-described arrangements are merely illustrative of the application of the principles of the present invention. Numerous other arrangements may be devised by those skilled in the art without departing from the spirit and scope of the invention.

What is claimed is:

1. A bistable circuit comprising a body of semiconductive material having two ohmic connection and a rectifying junction intermediate said ohmic connections, means connected to said ohmic connections for maintaining a normal direct current voltage gradient along said body, means connected to said rectifying junction for normally reverse-biasing said junction short of avalanche breakdown, said last-mentioned means cooperating with said voltage gradient at one side of said junction and including means for applying a potential to the other side of said junction, means for applying successive pulses of the same polarity to said other side of said junction, each pulse being of a polarity and amplitude such that a first pulse reverse-biases said junction sufficiently to cause a flow of carriers into said body due to avalanche breakdown of said junction, said voltage gradient thereby changing so that said junction is forward-biased on cessation of said first pulse, and a second pulse returns said junction to its normal reverse-bias condition, and output means connected to said semi-conductive body for detecting current flow due to the forward-biasing of said junction.

2. A bistable circuit in accordance with claim 1 wherein said output means includes impedance means connected to one of said ohmic connections and in series with said voltage gradient maintaining means.

3. A bistable circuit in accordance with claim 2 further comprising second impedance means connected to the other of said ohmic connections and in series with said voltage gradient maintaining means, the impedance of said second impedance means and said body when said junction is reverse-biased being large relative to the impedance of said first impedance means.

4. A bistable circuit in accordance with claim 1 wherein said output means comprises means connected to one of said ohmic connections and in series with said voltage gradient maintaining means for detecting an increase of current through said body when said junction is forward-biased.

5. A bistable circuit in accordance with claim 1 wherein said output means includes means connected between said potential applying means and said other side of said junction for detecting current flow when said junction is forward-biased.

6. A bistable circuit in accordance with claim 5 wherein said detecting means comprises a relay.

7. A bistable circuit in accordance with claim 5 further comprising diode means connected between said detecting means and said applying means and poled to present a high impedance to said applying pulses.

8. A counter circuit comprising a semiconductive member including a first ohmic contact, a second ohmic contact and a rectifying contact, a source of direct current power having two terminals, first resistance means connected between said first ohmic contact and one of said terminals, second resistance means connected between said second ohmic contact and the other of said terminals, third and fourth resistance means serially connected between said terminals, said rectifying contact being connected to a point between said third and fourth resistance means, and means connected between said rectifying contact and a first one of said terminals for supplying input pulses, whereby the application of each two successive input pulses produces across one of said first and second resistance means a single output pulse.

9. In combination, a double-base diode having a first base contact, a second base contact and an emitter contact, a source of direct current power having a most positive terminal, a most negative terminal, and an intermediate terminal, first resistance means connected between said first base contact and the most positive terminal, second resistance means connected between said second base contact and the most negative terminal, said emitter contact being connected to said intermediate terminal, and means connected between said emitter contact and one of said positive and negative terminals for supplying successive input pulses of one polarity, whereby each two successive input pulses produces across one of said resistance means a single output pulse of polarity opposite to that of said input pulses.

10. A bistable circuit comprising a body of semiconductive material having two ohmic connections and a rectifying junction intermediate said ohmic connections, means including a potential source connected to said ohmic connections for maintaining a normal direct current voltage gradient along said body, means connected to said rectifying junction for normally reverse-biasing said junction short of breakdown, said last-mentioned means including voltage divider connected to said potential source, means for applying successive pulses of the same polarity to said rectifying junction of an amplitude such that a first pulse reverse-biases said junction past breakdown, said junction being forward-biased on cessation of said first pulse, and a second pulse returns said junction to said normal reverse-bias condition, current detecting means connected between said junction and said means for normally reverse-biasing said junction, first diode means connected between said current detecting means and said pulse applying means and poled to present a high impedance to said pulse applying means, and second diode means connected between said current detecting means and one of said ohmic connections to protect said semiconductive body from current surges caused by said current detecting means.

11. A bistable circuit in accordance with claim 10 wherein said semiconductive body comprises a double-base diode and said current detecting means includes a relay.

12. A bistable circuit including a semiconductive body having first and second regions of respectively different type conductivity, thereby forming in said body a rectifying junction, first and second contact means electrically connected to said first region, third contact means electrically connected to said second region, means connected to said first and second contact means for establishing a normal voltage gradient along said region, said establishing means including impedance means, means connected to said third contact means for normally reverse-biasing said junction to a point short of avalanche breakdown, means for applying successive input pulses of the same polarity to said third contact means of a polarity and amplitude such that a first input pulse reverse-biases said junction to a point in the avalanche breakdown region thereof, whereby current carriers flow into said first region and, as a result, the impedance of said first region changes such that the current through said first region and said impedance means causes the voltage gradient along said first region to be redistributed such that said junction is forward-biased upon the cessation of said first pulse, a second input pulse returning said junction to its normal reverse-bias condition short of avalanche breakdown, and output means connected to said semiconductive body for detecting current flow derived from the forward-biasing of said junction.

13. In combination in a bistable circuit, a body of semiconductive material having thereon two ohmic contacts and a rectifying junction contact intermediate said two ohmic contacts, main power source means including serially-connected impedance means connected between said two ohmic contacts for establishing in said body a normal voltage gradient, biasing source means connected between one of said ohmic contacts and said rectifying junction contact for normally reverse-biasing said rectifying junction to a point short of avalanche breakdown, the polarity of said biasing source means being such as to forward-bias said junction in the absence of said main power source means, means for applying successive input pulses of the same polarity to said rectifying junction contact of a polarity and amplitude to cause a first input pulse to reverse-bias said junction to a point in the avalanche breakdown region thereby to change the impedance of the body between said junction and the other one of said ohmic contacts to cause a redistribution of the voltage gradient in said body to cause said junction to assume a forward-bias condition upon the cessation of the first input pulse, a second input pulse returning said junction to its normal reverse-bias condition short of avalanche breakdown, and output means connected to said semiconductive body for detecting current flow derived from the forward-biasing of said junction.

References Cited in the file of this patent

UNITED STATES PATENTS

| | | |
|---|---|---|
| 2,769,926 | Lesk | Nov. 6, 1956 |
| 2,801,340 | Keonjian et al. | July 30, 1957 |
| 2,802,117 | Mathis et al. | Aug. 6, 1957 |
| 2,863,056 | Pankove | Dec. 2, 1958 |
| 2,907,934 | Engel | Oct. 6, 1959 |
| 2,967,952 | Shockley | Jan. 10, 1961 |